US009178552B1

(12) United States Patent
Satarzadeh et al.

(10) Patent No.: US 9,178,552 B1
(45) Date of Patent: Nov. 3, 2015

(54) CHANNEL ADAPTIVE RECEIVER SWITCHABLE FROM A DIGITAL-BASED RECEIVER MODE TO AN ANALOG-BASED RECEIVER MODE

(71) Applicant: Xilinx, Inc., San Jose, CA (US)

(72) Inventors: Patrick Satarzadeh, Campbell, CA (US); Hongtao Zhang, San Jose, CA (US); Geoffrey Zhang, San Jose, CA (US); Zhaoyin D. Wu, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/547,394

(22) Filed: Nov. 19, 2014

(51) Int. Cl.
H03H 7/30 (2006.01)
H03H 7/40 (2006.01)
H03K 5/159 (2006.01)
H04B 1/16 (2006.01)
H04L 25/03 (2006.01)

(52) U.S. Cl.
CPC ............ *H04B 1/16* (2013.01); *H04L 25/03057* (2013.01)

(58) Field of Classification Search
CPC ................................................ H04L 25/03057
USPC ......................................................... 375/233
See application file for complete search history.

(56) References Cited

U.S. PATENT DOCUMENTS

| 7,009,945 | B1* | 3/2006 | Tang et al. | 370/286 |
| 2006/0209932 | A1* | 9/2006 | Khandekar et al. | 375/148 |
| 2012/0314756 | A1* | 12/2012 | Leibowitz et al. | 375/233 |
| 2014/0198859 | A1* | 7/2014 | Farrokhi | 375/257 |

OTHER PUBLICATIONS

Kim, Jaeha et al., "Equalizer Design and Performance Trade-Offs in ADC-Based Serial Links," *IEEE Transactions on Circuits and Systems—I: Regular Papers*, Sep. 2011, pp. 2096-2107, vol. 58, No. 9, IEEE, Piscataway, New Jersey, USA.

* cited by examiner

*Primary Examiner* — Tanmay Shah
(74) *Attorney, Agent, or Firm* — W. Eric Webostad (57) ABSTRACT

In a method for channel adaptation, an analog input signal is received with a bimodal receiver via a communications channel. The analog input signal is converted to a digital input signal with an analog-to-digital converter of a digital receiver of the bimodal receiver. Channel coefficients are detected for the digital input signal associated with the communications channel. The channel coefficients indicate a number of post-cursor taps of the bimodal receiver to be used to provide an equalized digital output signal from the digital input signal. It is determined whether the number of post-cursor taps or a value associated therewith is equal to or less than a threshold number. A switch from the receiving of the analog input signal by the digital receiver to an analog receiver of the bimodal receiver is made to provide the equalized digital output signal for the analog input signal.

18 Claims, 8 Drawing Sheets

CHANNEL ADAPTIVE RECEIVER SWITCHABLE FROM A DIGITAL-BASED RECEIVER MODE TO AN ANALOG-BASED RECEIVER MODE

TECHNICAL FIELD

The following description relates to integrated circuit devices ("ICs"). More particularly, the following description relates to a channel adaptive receiver for an IC.

BACKGROUND

Data may be communicated through dedicated lines ("wireline") and/or over-the-air ("wireless") to a variety of different types of stationary and/or mobile devices. Accordingly, there are many possible communication channels ("channels") in which to send data to a variety of devices.

Unfortunately, in some instances a user may not know a priori all the different channels to be used and/or conditions of such channels. As the complexity of wireline communications has increased, some designers have turned to using an analog-to-digital converter ("ADC") -based approach to use sophisticated digital channel equalization. On the other hand ADCs can be quite power hungry. In some instances, such sophisticated signal processing by ADC-based receivers is excessive for low signal loss channels ("low loss channels"). In other words, an excessive amount of power may be consumed by an ADC-based receiver in relation to resolving a data signal from a clean channel.

Accordingly, it would be desirable and useful to provide data signal resolution that avoids the above-described limitation of excessive power consumption for a low loss channel.

SUMMARY

A method relates generally to channel adaptation. In such a method for channel adaptation, an analog input signal is received with a bimodal receiver via a communications channel. The analog input signal is converted to a digital input signal with an analog-to-digital converter of a digital receiver of the bimodal receiver. Channel coefficients are detected for the digital input signal associated with the communications channel. The channel coefficients indicate a number of post-cursor taps of the bimodal receiver to be used to provide an equalized digital output signal from the digital input signal. It is determined whether the number of post-cursor taps or a value associated therewith is equal to or less than a threshold number. A switch from the receiving of the analog input signal by the digital receiver to an analog receiver of the bimodal receiver is made to provide the equalized digital output signal for the analog input signal.

An apparatus relates generally to receiving an analog input signal via a communications channel. In such an apparatus, a digital receiver has an analog-to-digital converter. The analog-to-digital converter includes a plurality of decision blocks coupled to receive the analog input signal. A subset of the plural of decision blocks has outputs coupled to a decoder of the analog-to-digital converter and coupled to an analog decision feedback equalizer of an analog receiver.

Another method relates generally to channel adaptation. In such a method for channel adaptation, an analog input signal is received with a bimodal receiver via a communications channel. The analog input signal is converted to a digital input signal with an analog-to-digital converter of a digital receiver of the bimodal receiver. Channel coefficients are determined for the digital input signal associated with the communications channel. The channel coefficients indicate a number of significant post-cursor taps of the bimodal receiver to be used to provide an equalized digital output signal from the digital input signal. It is determined whether the number of post-cursor taps is equal to or less than a threshold number. A subset of a plurality of comparators of the analog-to-digital converter is used for an analog receiver of the bimodal receiver. Outputs from the subset of the plurality of comparators are decision feedback equalized with an analog decision feedback equalizer of the analog receiver to provide to an equalized digital output signal for the analog input signal.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Before describing the examples illustratively depicted in the several figures, a general introduction is provided to further understanding.

Some channels may be noisy, and so a data signal communicated on such channels may have a significant amount of noise leading to more laborious post-reception processing to resolve such data signal. Some other channels may have very little noise ("clean"), and so a data signal communicated on such channels may have an insignificant amount of noise leading to less laborious post-reception processing to resolve such data signal. As previously described, an analog-to-digital-based ("ADC-based") receiver may consume an excessive amount of power in relation to resolving a data signal from a clean channel and/or a low-frequency channel, as such channels are generally low loss channels with respect to data rate.

As described below in additional detail, a channel adaptive receiver starts off as an ADC-based receiver and switches from this mode of operation to operation as an analog receiver in response to a condition of a channel being a low loss channel. Along those lines, a high-frequency and/or noisy channel, namely generally a "high loss channel" may cause such receiver to stay in an ADC-based receiver mode. By switching to an analog-based receiver mode to process data for a low loss channel, power may be conserved in comparison to processing such data with an ADC-based receiver.

With the above general understanding borne in mind, various configurations for a channel adaptive receiver are generally described below.

Figure 1:
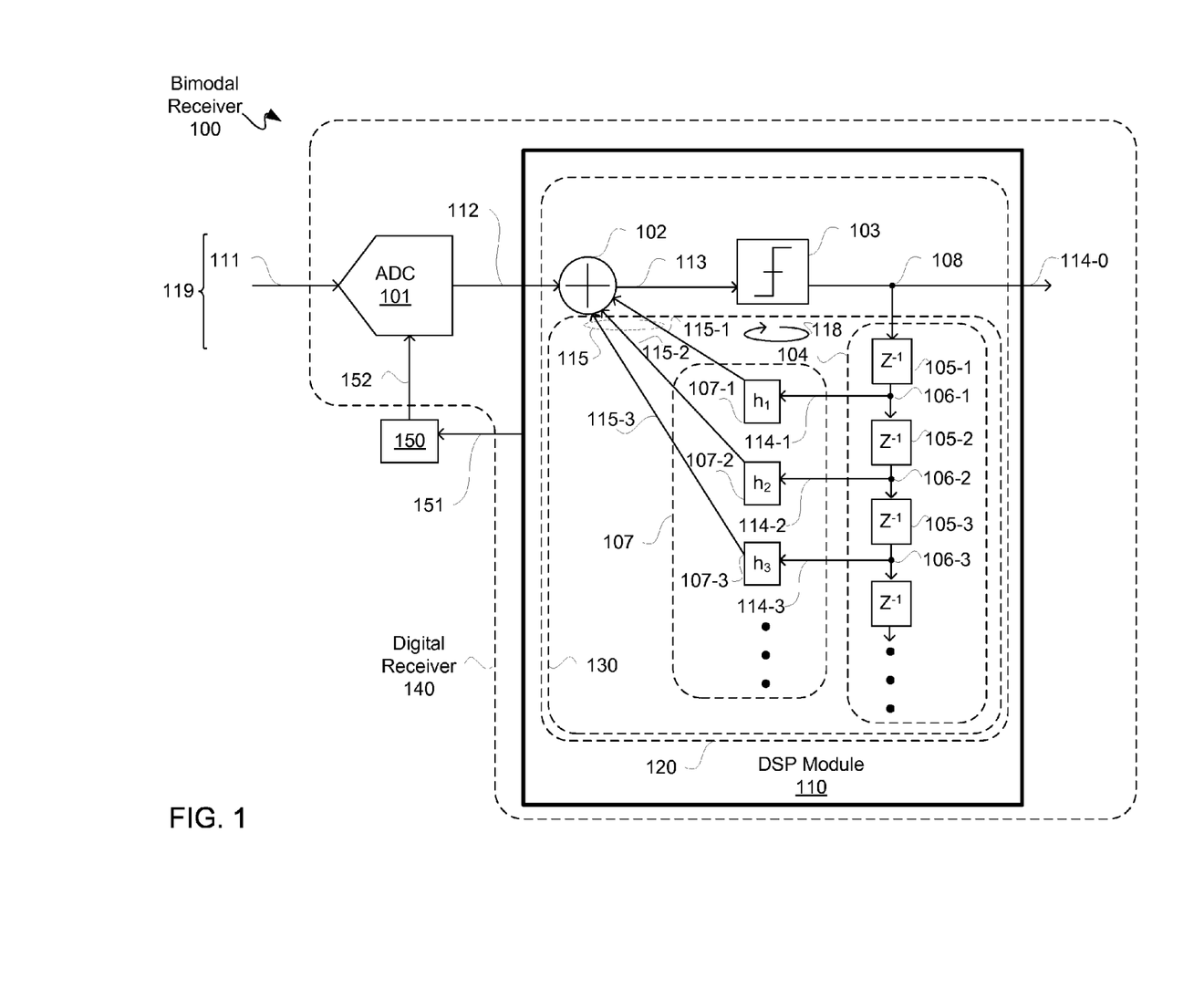
FIG. 1 is a block diagram depicting an analog-to-digital converter ("ADC")-based receiver ("digital receiver") of a bimodal receiver which uses decision feedback equalization ("DFE").

FIG. 1 is a block diagram depicting an analog-to-digital converter-based receiver ("digital receiver") 140 of a bimodal receiver 100. A received analog input signal 111 may be an input to an analog-to-digital converter ("ADC") 101 of digital receiver 140 to produce a received digital signal 112. ADC 101 may be a flash ADC, as described below in additional detail.

ADC 101 may be coupled to a digital signal processing module 110. Such digital signal processing module 110 may include a digital signal processor or one or more digital signal processing blocks ("DSPs") of a programmable logic device, such as an FPGA for example. However, it should be understood that other types of integrated circuits may incorporate some or all the components of bimodal receiver 100. Moreover, feed forward equalizers ("FFEs"), maximum likelihood sequence detectors ("MLSDs"), or other components of a receiver are not illustratively depicted for purposes of clarity and not limitation.

Digital signal processing module 110 may be coupled to provide one or more control signals 151 to controller 150, and controller 150 may be coupled to provide one or more control signals 152 to ADC 101. Control signals 151 may indicate a number, N, of post-cursor taps to use to equalize a signal for a channel. Control signals 151 may further indicate at least one channel coefficient or at least two threshold values therefor, which may be positive and negative threshold values of such at least one channel coefficient for input to corresponding comparators. The number N of post-cursor tap values to be used to equalize a signal for a channel may be determined to be greater than a threshold associated with used of an analog receiver of bimodal receiver 100, as described below in additional detail.

Digital signal processing module 110 may be configured as a digital decision feedback equalizer ("DFE") 120. Digital DFE 120 may include a digital adder 102, a digital decision block 103, a digital delay chain 104, and digital channel coefficient blocks 107 coupled in a feedback loop 118.

Received digital signal 112 may be input to adder 102 for addition with one or more digital channel compensated feedback signals 115, as described below in additional detail. A digital sum output signal 113 from adder 102 may be input to a decision block 103. Decision block 103 may include a latch for output of an equalized digital output signal 114-0

An equalized digital output signal 114-0 from decision block 103 may be provided to an output node 108. Output node 108 may be coupled to an input of a delay chain 104. Delay chain 104 may be formed of a plurality of delays, such as delays 105-1 through 105-3, coupled in series. Each of such plurality of delays may have a corresponding output tap, such as output taps 106-1 through 106-3 respectively of delays 105-1 through 105-3. Along those lines, there may be an output tap 106 between each successive pair of delays 105 coupled in series with one another.

Progressively delayed versions of equalized digital output signal 114-0 may be sourced from output taps 106-1 through 106-3 as equalized digital feedback signals 114-1 through 114-3, respectively. Equalized digital feedback signals 114-1 through 114-3 may be input to channel coefficient blocks 107-1 through 107-3.

Channel coefficient blocks 107-1 through 107-3 may each be configured with a corresponding channel coefficient, such as channel coefficients $h_1$ through $h_3$, respectively. Equalized digital feedback signals 114-1 through 114-3 may be correspondingly multiplied with channel coefficients $h_1$ through $h_3$ by channel coefficient blocks 107-1 through 107-3, respectively.

In response to such multiplications, channel coefficient blocks 107-1 through 107-3 may respectively output digital channel compensated feedback signals 115-1 through 115-3 (singly and collectively "115"). Channel compensated feedback signals 115-1 through 115-3 may all be input to adder 102 for addition with a received digital signal 112 output from ADC 101 for input to DFE 120 for output of an equalized digital output signal 114-0 from DFE 120. Along those lines, after passing through a digital equalization feedback path 130, including delay chain 104 and channel coefficient blocks 107, respectively coupled to output node 108 and adder input ports of adder 102, a previously received digital signal 112 may be digitally decision feedback equalized for addition with a subsequently received digital signal 112 to remove noise from such later received signal.

Even though three delays 105-1 through 105-3, three delay tap 106-1 through 106-3, and three channel coefficient blocks 107-1 through 107-3 are illustratively depicted, there may be many more than three of each of these in a DFE 120. Along those lines, for a received analog input signal 111 obtained from a noisy channel 119, DFE 120 may employ a longer delay chain 104 with more than three taps 106, as well as corresponding channel coefficient blocks 107, to resolve a received analog input signal 111 into an equalized digital output signal 114-0.

Digital receiver equalization to provide a digital output signal 114-0 is generally significantly less complex to implement for large numbers of bits than a comparable analog-based receiver. Along those lines, with respect to FFEs and MLSDs, such components are more difficult to implement for analog-based receivers than for digital-based receivers. However, DFE may be used in analog-based receivers.

Figure 2:
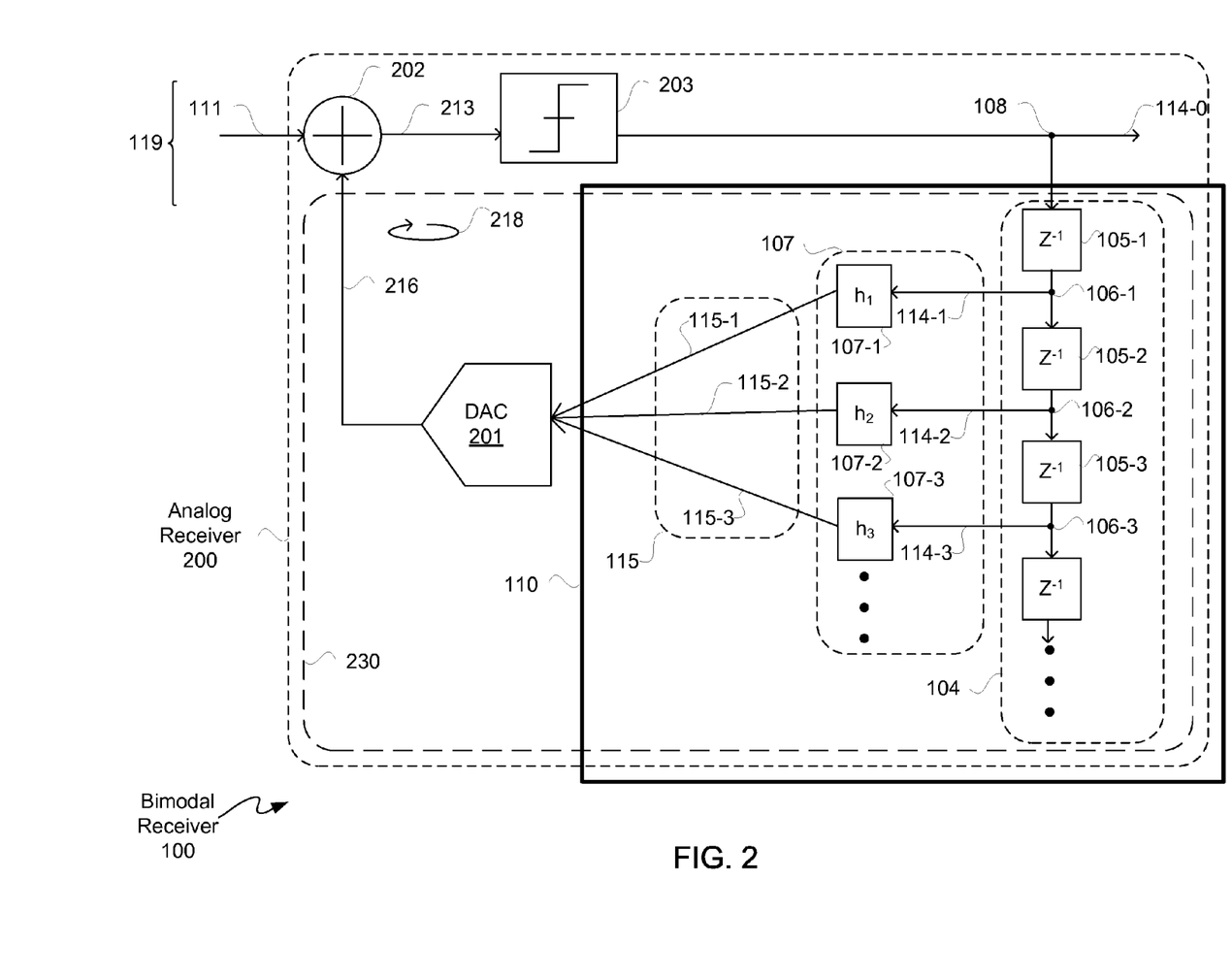
FIG. 2 is a block diagram depicting an analog receiver, which may be of a bimodal receiver DFE.

FIG. 2 is a block diagram depicting an analog receiver 200, which may be of a bimodal receiver 100. A received analog input signal 111 from channel 119 may be an input to an analog summer or analog summing node 202 of analog receiver 200 for addition with a channel compensated analog feedback signal 216, as described below in additional detail.

Analog summer 202, an analog decision block or analog-to-digital data slicer 203, a digital delay chain 104, digital channel coefficient blocks 107, and a digital-to-analog converter ("DAC") 201 may be coupled in a feedback loop 218 to provide, in part, an analog DFE 230. Summer 202 and analog decision block 203 of analog DFE 230 may be coupled to and incorporated in digital signal processing module 110, where such digital signal processing module 110 may use a subset of digital channel coefficient blocks 107 and a subset of digital delay chain 104 of FIG. 1 to provide such DFE 230.

An analog sum output signal 213 from summer 202 may be input to analog decision block 203, such as an analog-to-digital slicer such as a comparator. A threshold voltage input (not shown in this figure) may be provided as an input to analog decision block 203 for comparison. Analog decision block 203 may provide an equalized digital output signal 114-0.

An equalized digital output signal 114-0 from analog decision block 203 may be provided to an output node 108. Output node 108 may be coupled to an input of a delay chain 104, as previously described. However, for an analog receiver 200, fewer channel coefficients, and thus fewer taps 106, delays 105 and coefficient blocks 107, may be used in comparison to a digital receiver 140.

Channel compensated feedback signals 115-1 through 115-3 may all be input to digital-to-analog converter ("DAC") 201 effectively for addition and conversion thereof from respective digital channel compensated feedback signals 115-1 through 115-3 to a channel compensated analog feedback signal 216.

A channel compensated analog feedback signal 216 may be input to summer 202 for addition with a received analog input signal 111 from channel 119 for input to analog decision block 203 for output of an equalized digital output signal 114-0 from analog receiver 200. Along those lines, after passing through a digital equalization feedback path of analog receiver 200, including delay chain 104, channel coefficient blocks 107 and DAC 201, respectively coupled to output node 108 and an input port of analog summer 202, a previously received analog signal 111 may be digitally decision feedback equalized for addition with a subsequently received analog signal 111 to remove noise from such later received signal.

However, the noisier a channel 119 is, a progressively wider DFE 230 may be used in a digital feedback path of analog receiver 200. Accordingly, significantly more loading on analog summer 202 may be present for such a wider DFE 230. Along those lines, as such DFE 230 becomes wider to address a noisy channel 119, such as for example inter-symbol-interference ("ISI") present in a received analog input signal 111, such DFE 230 may generate ISI in attempting to mitigate ISI. In short, analog receiver 200 may become bandwidth limited with respect to noisy channels.

Accordingly, for noisy channels, a digital receiver 140 may be used. However, as previously indicated, it may not be known a priori whether channel 119 is too noisy to use an analog receiver 200 or not, and so conventionally a digital receiver 140 has been used just in case channel 119 is too noisy for using an analog receiver 200. However, digital receiver 140 consumes more power than a corresponding analog receiver 200 generally due to use of an ADC 101, including without limitation a flash ADC. So, for example, using a digital receiver 140 on a low-frequency "clean" channel 119 consumes a significant amount of power in comparison to using an analog receiver 200 on such a channel.

For analog-based DFE, output of analog decision block 203 is digital, but analog feedback signal 216 to analog summing node 202 crosses an analog barrier. Making a decision and feeding back such decision by analog receiver 200 involves crossing an analog-to-digital or digital-to-analog barrier twice. Crossing these barriers in one bit period, namely one Unit Interval ("UI"), may be difficult.

Decision feedback equalization is to be performed in one UI. A UI may be defined by a number of taps of a phase interpolator or other device. Thus, a UI may be a phase adjustment range for an input bit with reference to a data eye. To relax this timing, a loop-unrolled or speculative DFE may be used. In other words, to perform decision feedback equalization within one UI, analog feedback loop 218 may be unrolled, as described below in additional detail.

Figure 3:
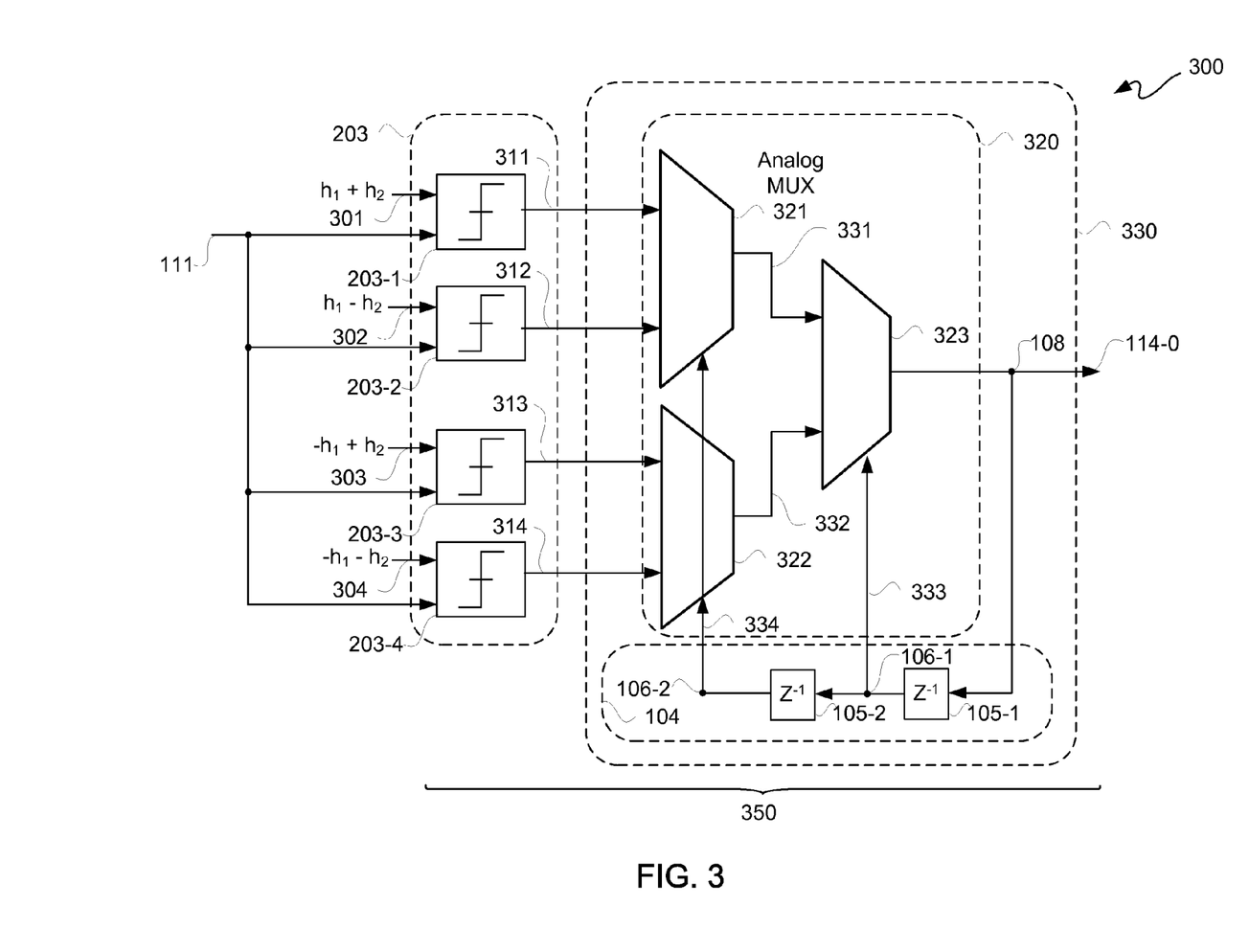
FIG. 3 is a block diagram depicting an exemplary two tap unrolled DFE analog receiver.

FIG. 3 is a block diagram depicting an exemplary unrolled analog receiver 300. Analog receiver 300 may have an unrolled feedback loop, namely an unrolled or speculative DFE 330. Unrolled DFE 330 is for two taps in this example for purposes of clarity and not limitation, as one or more than two tap unrolling may be used, as shall be appreciated from this example of a two-tap unrolled DFE 330.

Unrolling may be used to effectively perform all the operations around a closed-loop analog feedback loop 218, namely decision, delay, coefficient multiplication, digital-to-analog conversion, and summation, without performing all of such operations sequentially by inputting all possible channel coefficient combinations for processing in parallel. Such unrolling may be used to perform decision feedback equalization in one UI 350, as only one analog-to-digital barrier is crossed, namely going from analog input to digital output across analog decision block 203.

Along those lines, for the example of two tap unrolling, there are four possible analog input combinations 301 through 304, namely for four possible thresholds, with respect to summation output of channel coefficients or post-cursor tap weights, namely $h_1+h_2$, $h_1-h_2$, $-h_1+h_2$, or $-h_1-h_2$. Effectively, summing of feedback in analog receiver 200 is replaced by using more than one comparator for analog decision block 203, each slicer or comparator or analog decision block 203-1 through 203-4 of which may have its own threshold which depends on the possible coefficient combinations of DFE feedback tap weights.

Analog input combinations 301 through 304 may be input in parallel to corresponding analog decision blocks 203-1 through 203-4, which collectively may be analog decision block 203. A received analog input signal 111 may be input to each of analog decision blocks 203-1 through 203-4 in parallel along with analog input combinations or thresholds 301 through 304, as previously described.

By having all possible combinations or permutations of channel coefficients that may be summed by analog summer 202, effectively each of four thresholds of such decision slicers or comparators 203-1 through 203-4 is pre-computed and adjusted in advance to make decisions. A correct decision of such decisions, namely a correct threshold of such four thresholds in this example, may then be selected by use of selection circuitry, such as a decision tree 320. This selection may be based on the previous two decisions, such as feedback through delays of a delay chain 104.

Digital decision outputs 311 through 314 respectively from analog decision blocks 203-1 through 203-4 may be inputs to a decision block, such as a decision tree 320. Digital decision outputs 311 through 314 may all be logic zeros, logic ones, or some combination of one or more of logic ones and logic zeros. In this example, decision tree 320 is formed of multiplexers 321 through 323; however, other configurations of a decision tree may be used in other implementations. For example a four-to-one multiplexer may be used. Moreover, for a one tap implementation, namely for a $+h_1$ and a $-h_1$ coefficient, a single 2-to-1 multiplexer may be used.

In this example, digital decision outputs 311 and 312 are inputs to a 2-to-1 input multiplexer 321 to select an interim output 331, and digital decision outputs 313 and 314 are inputs to a 2-to-1 input multiplexer 322 to select an interim output 332. Interim outputs 331 and 332 are input to a 2-to-1 output multiplexer 323 to select an equalized digital output signal 114-0. Along those lines, an output port of output multiplexer 323 may be output node 108.

A digital output signal 114-0 may be fed back as sourced from output node 108 as an input to delay 105-1. Output of delay 105-1 may be provided to an output tap 106-1. Output of delay 105-1 may be provided as an input to delay 105-2. Output of delay 105-2 may be provided to an output tap 106-2. Control select signals 333 and 334 may respectively be sourced from output taps 106-1 and 106-2, namely digital output signals respectively of delays 105-1 and 105-2. Effectively, delays 105-1 and 105-2, and two output taps 106-1 and 106-2 may form a delay chain 104.

Control select signal 334 is provided as a control select signal to multiplexer 321 to select either digital decision output 311 or 312 as an interim output 331, and control select signal 334 is provided as a control select signal to multiplexer 322 to select either digital decision output 313 or 314 as an interim output 332. Control select signal 333 is provided as a control select signal to multiplexer 323 to select either interim output 331 or 332 as equalized digital output signal 114-0.

Figure 4:
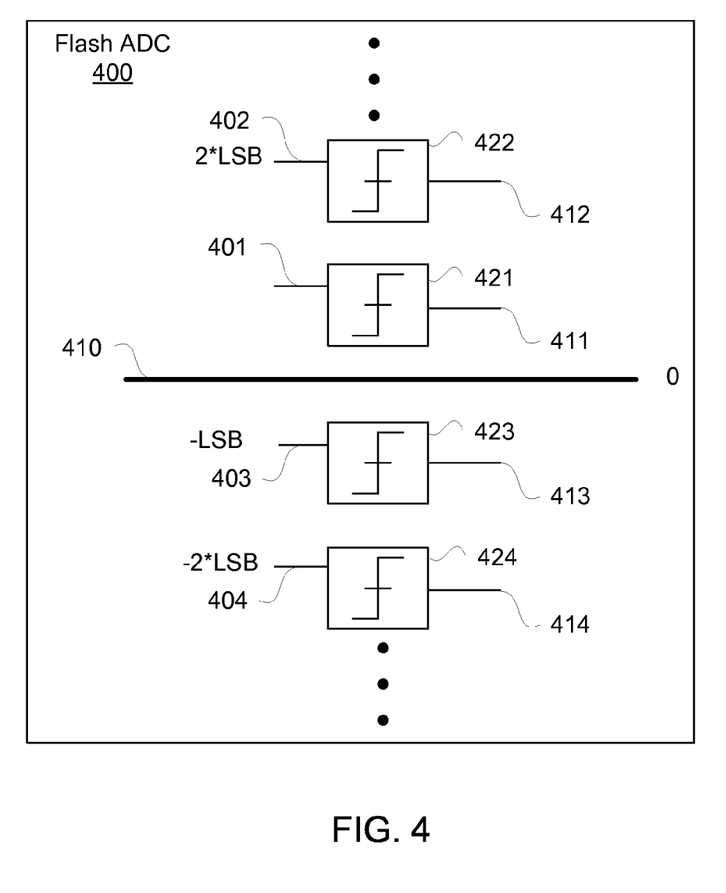
FIG. 4 is a block diagram depicting an exemplary flash ADC.

FIG. 4 is a block diagram depicting an exemplary flash ADC 400. Flash ADC 400 may be ADC 101 of FIG. 1. In this example, there are four data slicers 421 through 424 for a two bit implementation. However, only three data slicers may be used for a 2-bit implementation to determine a current position in four separate regions of an input signal, namely, four regions means that there are three boundaries so only three slicers may be used. Generally, for an m-bit implementation, there may be as few as $2^m-1$ slicers. However, for purposes of clarity and not limitation, an example of four data slicers 421 through 424 for a 2-bit implementation of a digital processing portion of flash ADC 400 is described. More data slicers may be used to process more than two bits, and accordingly power consumption may go up, as known, significantly for more bits.

Coded input 401 may include an input bit, such as a Least Significant Bit ("LSB") of a digital value code representation of an analog input, multiplied by $2^0$. Code input 402 may be $2^1$ multiplied by the same positive input bit as in code input 401, such as the LSB input for example. This multiplication of a code input bit by a binary scaling number of course may increase for higher orders of powers of two in a positive direction. Likewise, a code input 403 may be the same code input bit, such as the LSB for example, multiplied by $2^0$ but for negative values of such code input bit. Code input 404 may be $2^1$ multiplied by the same negative code input bit as in code input 403, such as a negative of the LSB input for example. This multiplication of a binary scaled coded input bit may increase for higher orders of powers of two in a negative direction. So even though two bit multiplications are illustratively depicted for positive and negative directions, more than two bit multiplications may be used in positive and negative directions. Line 410 may generally indicate a 0 crossing level. Moreover, a fixed threshold input (not shown in this figure) may be input to data slicers 421 through 424 for purposes of comparison with coded inputs 401 through 404 to produce corresponding coded outputs 421 through 424.

For an ADC, these multiplications may for example be for a binary code, a thermometer code, or a combination thereof. For purposes of clarity by way of example and not limitation, a binary code is assumed.

After an LSB, a next higher bit in a coded value may likewise be multiplied in positive and negative directions for progressive higher orders of powers of 2, and so on. Positive and negative digital coded bits representing a digital value of an analog input may be input to data slicers. In this example, coded inputs 401 through 404 are respectively input to data slicers 421 through 424, and coded digital outputs 411 through 414 are respectively obtained from data slicers 421 through 424 in response to coded inputs 401 through 404. Coded digital inputs 401 through 404 may be an LSB portion of received digital signal 112.

Accordingly, for LSBs to Most Significant Bits ("MSBs") multiplied by progressive orders of powers of 2 in positive and negative directions, there may be many data slicers, such as flash ADC comparators. A number of flash ADC comparators may be associated with a number of post-cursor tap values, as described below in additional detail.

For an N-tap analog-based unrolled DFE, 2N comparators may be used. Accordingly, for a large number of taps, there may be a large number of unrolled comparators. A relative difference between thresholds may become more uniform as N grows, and hence such an analog-based unrolled DFE may appear to be a flash ADC with uniform levels, such as such an LSB level for example. For example, a 5-bit Flash ADC may have $2^5-1$ comparators and a 5-tap loop analog receiver with an unrolled DFE may have 32 comparators. For a distribution of channel tap values where loop unrolled DFE thresholds have a relative difference close to that of an LSB level of a uniformly spaced Flash ADC, then at such proximity there may be a switch from an analog-based receiver to a digital-based receiver.

For the above example, if all 5 DFE tap coefficients are significant to remove noise, then a channel used to transmit such received data may be identified as being significantly lossy. For such a lossy channel, using comparators to build a 5-bit flash ADC paired with a DSP may be used over using a corresponding analog receiver with an unrolled DFE. However, if for example, only the first two DFE tap coefficients, namely only the first two post-cursor tap values or weights, are significant for removing noise, and a remainder of such 5 taps are small, then such a channel is a low loss channel. For such a low loss channel, an analog-based unrolled DFE may be used with 4 loop-unrolled comparators, with the remaining 28 comparators turned off to save power, reduce load, and/or other reasons. This example is for purposes of clarity and not limitation, and many other examples can be used with different numbers of DFE tap coefficients.

Figure 5:
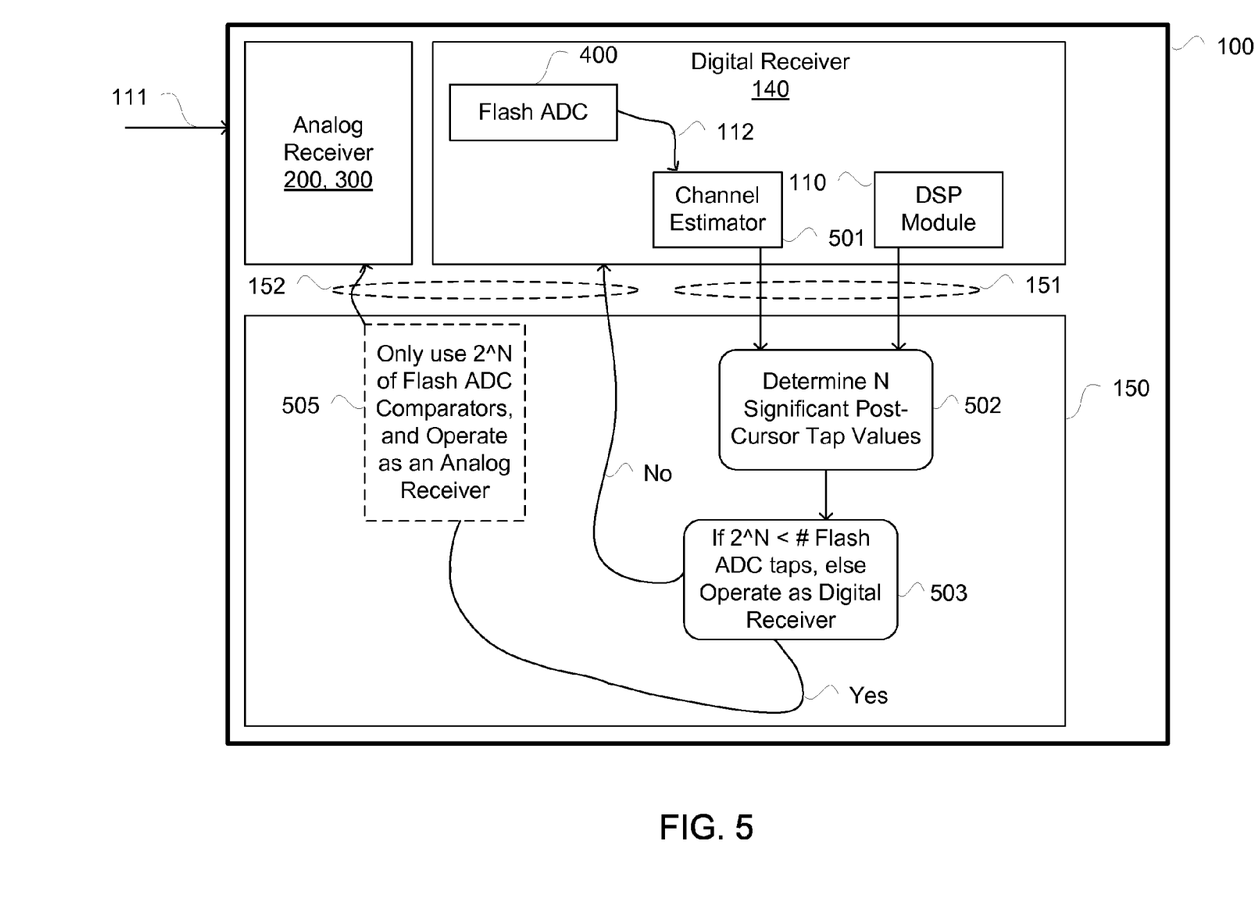
FIG. 5 is a flow diagram depicting an exemplary reception mode select cycle for a bimodal receiver.

FIG. 5 is a flow diagram depicting an exemplary reception mode select cycle 500 for a bimodal receiver 100. In reception mode select cycle, a bimodal receiver 100, including digital receiver 140 switchable to an analog receiver 200 or 300, and a controller 150, determines whether to operate either as analog-based or digital-based receiver, as described below in additional detail. This selection and switch may be performed during operation, namely dynamically or "on-the-fly", responsive to detection of channel parameters, such as channel coefficients.

As previously described, an analog input signal 111 may be received by a bimodal receiver 100. Bimodal receiver 100 may have a digital receiver 140 and an analog receiver 200 or 300. However, rather than having a separate analog receiver and a separate digital receiver 140, an unrolled analog receiver 300 may be used to share comparators of flash ADC 400. Accordingly, further description assumes an unrolled analog receiver 300 is used. Along those lines, a portion of analog receiver 300 may be formed from analog decision blocks, such as comparators, of flash ADC 400 of digital receiver 140, such as described below in additional detail.

Analog input signal 111 may be converted by flash ADC 400 of digital receiver 140 into a digital input signal 112. Digital input signal 112 may be provided to a channel estimator 501. Channel estimator 501 may be configured using resources of a digital signal processing module 110. Channel estimator 501 may provide at least one channel coefficient via control signals 151 to controller 150. Digital signal processing module 110 may be configured to provide adjustable thresholds using such channel coefficients obtained from channel estimator to provide as control signals 151 to controller 150. As control signals 151 may indicate channel coefficients and/or adjustable threshold values for comparators, for purposes of clarity by way of example and not limitation, it shall be assumed that digital signal processing module 110 is configured to use channel coefficients, such as for example $h_1$ and $h_2$, from channel estimator 501 to determine threshold values, such as for example $h_1+h_2$, $h_1-h_2$, $-h_1+h_2$, or $-h_1-h_2$, for respective input put comparators.

Controller 150 may be configured with control logic, such as a finite state machine, to perform operations as described below in additional detail. From values or weights of channel coefficients, controller 150 may determine a number N of significant post-cursor tap values to use to equalize a signal at 502. This number N may be less than or equal to a threshold number to invoke using an analog receiver 200 or 300 of bimodal receiver 100, or may be above such threshold number to continue with using a digital receiver 140 of bimodal receiver 100. Along those lines, controller 150 may have registered therein one or more threshold values for a plurality of channel coefficients. Channel coefficients determined to be greater than their corresponding threshold values may be considered to be significant for purposes of obtaining an equalized output signal, and channel coefficients determined to be less than or equal to their corresponding threshold values may be considered insignificant for purposes of obtaining an equalized output signal. Thus, a number of channel coefficients determined to be significant may correspond to a number of N significant post cursor tap values. Actual values or weights, as well as a sufficient number N of post-cursor taps, may vary from application-to-application. However, for some applications a data signal may be resolved from a clean channel and/or a low-frequency channel, namely a low loss channel with respect to data rate, with N being four or less.

With a number, N, of significant post-cursor taps to use to equalize a signal for a communications channel 119 used to convey analog input signal 111, a determination may be made at 503 whether to switch from digital receiver 140 to analog receiver 300.

Controller 150 may be configured to use such a number, N, of significant post-cursor taps to determine whether to switch from using digital receiver 140 to using analog receiver 200 to further process, such as for equalization, such analog input signal 111. For example, controller 150 may be configured to determine at 503 whether $2^N$ is less than a number of flash ADC taps of flash ADC 400. If such determination at 503 is true, then control signals 152 may be provided to analog receiver 200 and digital receiver 140 to indicate use of only $2^N$ flash ADC comparators of flash ADC 400 and operate as an analog receiver, as indicated at 505, for "analog" equalization. If, however, such determination at 503 is false, then control signals 152 may be provided to digital receiver 140 to indicate to continue to process analog input signal with digital receiver 140 for "digital" equalization.

Figure 6:
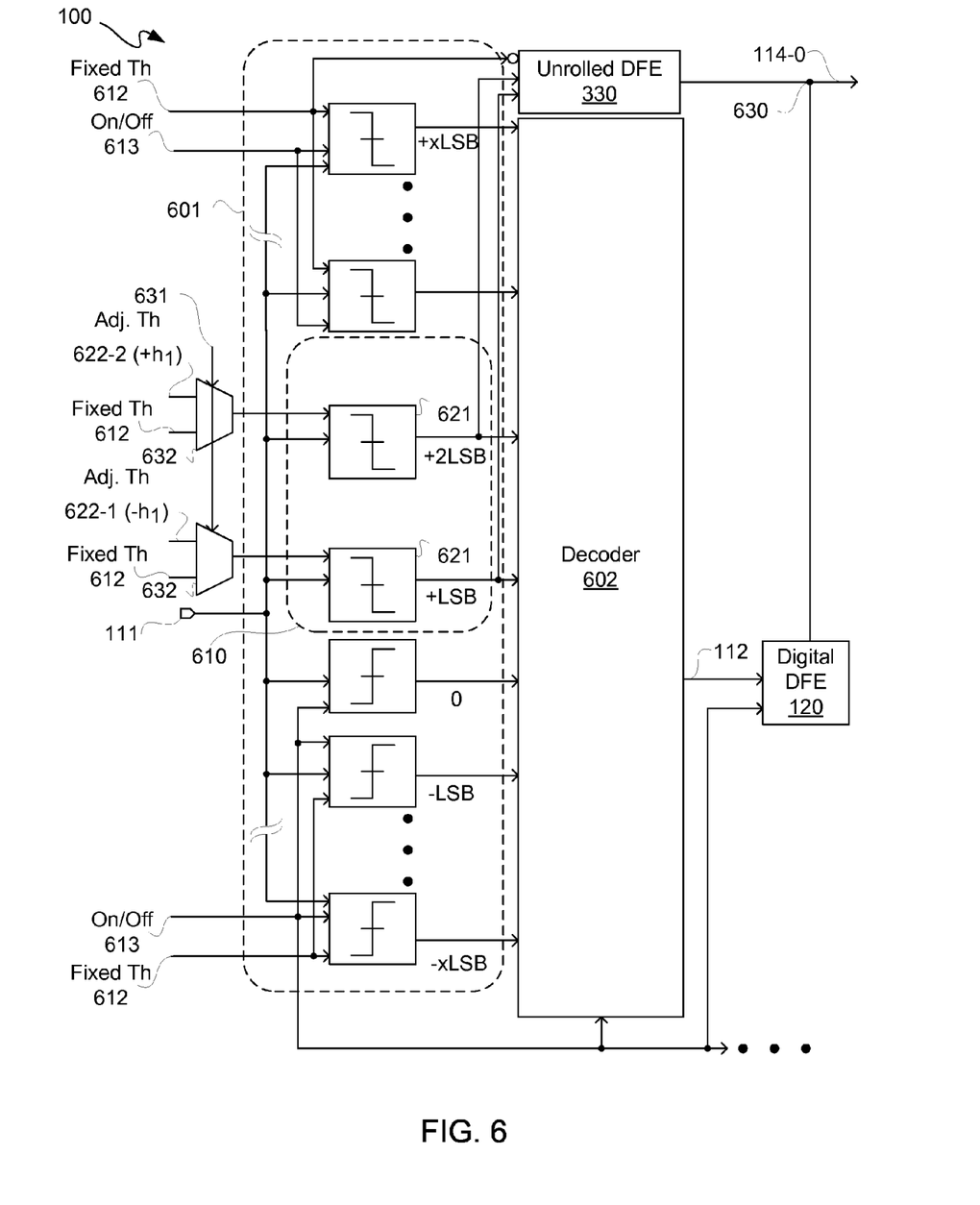
FIG. 6 is a block diagram depicting an exemplary bimodal receiver.

As described below in additional detail, a number of data slicers or comparators for an analog input receiver may be selected responsive to a number, N, of post-cursor taps to use to equalize a signal. FIG. 6 is a block diagram depicting an exemplary bimodal receiver 100. Bimodal receiver 100 is illustratively depicted for a one tap analog receiver 300 within bimodal receiver 100; however, in other configurations, more than one tap may be used for an unrolled analog receiver 300.

Analog input signal 111 may be provided as an input to a plurality of decision blocks 601, such as a plurality of comparators for example, of flash ADC 400. Outputs of comparators 601 may be binary scaled and/or thermometer scaled, and thus may generally range from −xLSB . . . 0 . . . −xLSB for x a positive integer. Outputs of comparators 601 may be provided as inputs to a decoder 602 of flash ADC 400. Decoder 602 may be a thermometer and/or binary code decoder for example.

A subset 610 of such comparators 601 may have outputs provided to both decoder 602 and to an unrolled DFE 330. Accordingly, such subset 610 of comparators 601 may be shared for use as an analog receiver 300 including unrolled DFE 330. Thus, either output from DFE 330 or decoder 602 may be used for providing an equalized digital output signal 114-0, where an equalized digital output signal 114-0 is provided from unrolled DFE 330, and where a digital input signal 112 is output from decoder 602 for input to a digital DFE 120 to output an equalized digital output signal 114-0 for such digital input signal 112.

All of comparators 601 except for those in subset 610 may receive only a fixed threshold signal 612. Comparators 621 of subset 610 of comparators 601 may be coupled to receive either an adjustable threshold 622 or a fixed threshold 612. Even though there are only two comparators 621 of subset 610 for a single tap implementation, more than two comparators 621 may be coupled to receive either an adjustable threshold 622 or a fixed threshold 612 via multiplexers 632. For a single tap implementation, control signals 152 may include a control select signal 631 and adjustable thresholds 622.

For use of flash ADC 400, all of comparators 601 may receive fixed threshold 612, and so control select signal 631 may persist in such selection of fixed threshold 612 for output from multiplexers 632. If, however, a switch is to be made from digital receiver 140 to analog receiver 300, then control select signal 631 may be asserted to select adjustable thresholds 622-1 and 622-2 respectively for a $-h_1$ and a $+h_1$ channel coefficient, such as obtained in control signals 152 from controller 150 via channel estimator 501. Optionally, adjustable thresholds 622 may be provided directly from digital signal processing module 110 to corresponding multiplexers 632, which are selectable responsive to assertion of one or more control select signals 631.

Adjustable thresholds 622 may be for more than one channel coefficient as in the above example. Along those lines, for a one to more than one tap selectable use, subset 610 may have more than two comparators 621 and corresponding multiplexers 632 coupled to receive a plurality of control select signals 631 to implement any one to N tap implementation. For many applications, a number of significant post-cursor taps N may be equal to or less than 4, namely subset 610 may use 32 comparators 621 of comparators 601. Furthermore, even though +LSB and +2LSB comparators 621 of comparators 601 are illustratively depicted for subset 610, any subset of comparators 601 may be used for receiving adjustable thresholds.

For assertion of control select signal 631 to switch to analog receiver 300, on/off signal 613 may be asserted. Prior to assertion of on/off signal 613, all comparators of comparators 601, decoder 602, digital DFE 120, and other downstream digital processing blocks may all be on, and unrolled DFE 330 may be off. Accordingly, output at wired-OR output node 630 may be an equalized digital output signal 114-0 from digital DFE 120, as unrolled analog DFE 330 is off. However, after assertion of on/off signal 613 to switch from using digital receiver 140 to using analog receiver 300, all comparators of comparators 601 other than those comparators 621 in use in subset 610 for analog signal processing, decoder 602, digital DFE 120, and other downstream digital processing blocks may all be turned off, and unrolled DFE 330 may be turned on.

For a single tap implementation, two comparators 621 may be always on during use of bimodal receiver 100. However, for a 1 to N tap selectable configuration, on/off signal 613 may be selectively asserted to selected comparators 621 for a number of taps though other circuitry not shown for purposes of clarity and not limitation. For those comparators 621 selected for use for a number of taps implementation, outputs of such comparators provided as inputs to unrolled analog DFE 330 are live. As unrolled analog DFE 330 is turned on to receive such live outputs, an equalized digital output signal 114-0 may be output from unrolled analog DFE 330 in response to such inputs from such selected comparators 621. Accordingly, output at wired-OR output node 630 may be an equalized digital output signal 114-0 from unrolled analog DFE 330, as digital DFE 120 is off.

Figure 7:
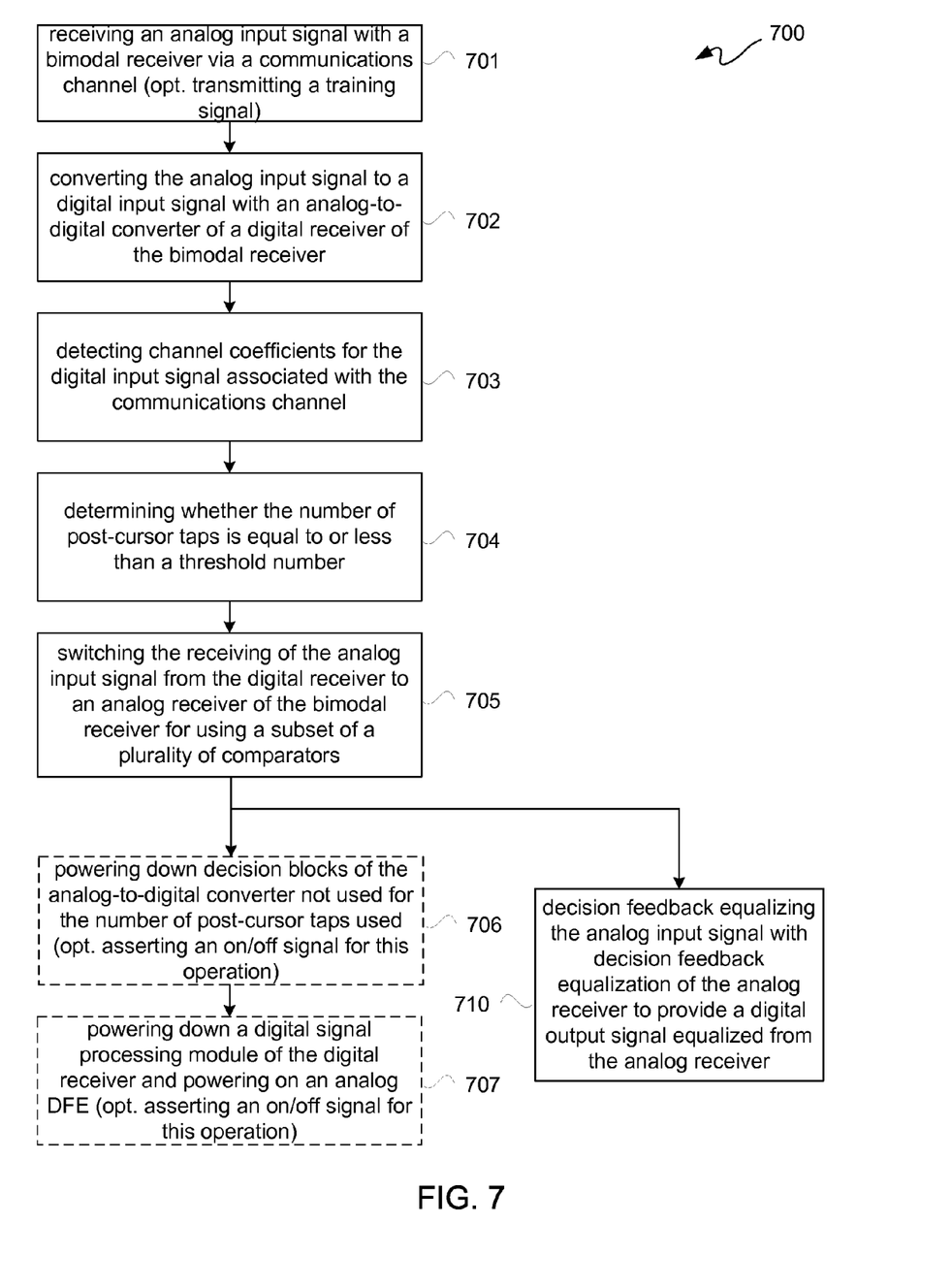
FIG. 7 is a flow diagram depicting an exemplary channel adaptation flow.

FIG. 7 is a flow diagram depicting an exemplary channel adaptation flow 700. Channel adaptation flow 700 is further described with simultaneous reference to FIGS. 1-7.

At 701, an analog input signal 111 may be received by a bimodal receiver 100 via a communications channel 119. As part of 701, optionally a training signal may be transmitted via communications channel 119 to provide analog input signal 111. At 702, analog input signal 111 may be converted to a digital input signal 112 with an analog-to-digital converter 101 of a digital receiver 140 of bimodal receiver 100. At 703, channel coefficients 107 may be detected for digital input signal 112 associated with communications channel 119. This detecting of channel coefficients may be by a channel estimator 501, and these channel coefficients may be channel impulse response coefficients. This detecting may include Least Mean Squared filtering.

Channel coefficients 107 may indicate a number of post-cursor taps 106 of bimodal receiver 100 to be used to provide an equalized digital output signal 114-0 from digital input signal 112. At 704, it may be determined whether the number of post-cursor taps 106, or a value associated therewith as at 503, is equal to or less than a threshold number. This threshold number may be associated with a number of flash ADC taps, as previously described. Channel coefficients indicate 107 may indicate a number of post-cursor taps 106 of bimodal receiver 100 to be used to provide an equalized digital output signal 114-0 from the digital input signal 111.

At 705, a switch from reception of analog input signal 111 by digital receiver 140 to an analog receiver 300 of bimodal receiver 100 may be made to provide equalized digital output signal 114-0 for analog input signal 111. This switch at 705 may be to use a subset 610 of comparators 621 of ADC 101 or 400 for an analog receiver 200 or 300 of bimodal receiver 100. At 710, such analog input signal may be decision feedback equalized with decision feedback equalization of analog receiver 300 to provide digital output signal 114-0 equalized by analog receiver 300. A number of post-cursor tap coefficients used for this equalization may include tap weights corresponding to channel coefficients. A portion of such tap weights, after at least a first post-cursor coefficient and a second post-cursor coefficient, may not be used for such decision feedback equalizing. A number of analog decision blocks 203 of an unrolled decision feedback equalizer 330 of analog receiver 300 may be used for a corresponding number of significant post-cursor tap coefficients. This decision feedback equalizing may be of outputs from a subset of a total number of analog decision blocks 203, which may include corresponding comparators, of an analog decision feedback equalizer 330 of analog receiver 300 to provide to an equalized digital output signal 114-0 for analog input signal 111.

Optionally, at 706, in response to receiving analog input signal 111 with analog receiver 330, such as previously described, decision blocks of analog-to-digital converter 101 below a threshold cut-off ("down decision blocks") may be powered down for those not used for a number of significant post-cursor taps used. Optionally, at 707, in response to receiving analog input signal 111 with analog receiver 300, such as previously described, a digital signal processing module 110 of digital receiver 140 may be powered down. This powering down at 706 or 707 may optionally include asserting an on/off signal 613 in response to such switching to an analog receiver 300, or determining such a number of significant post-cursor taps is equal to or less than a threshold number. Along those lines, power down at 706 may optionally include turning off a plurality of comparators other than a subset thereof in response to asserting of an on/off signal 613, as previously described. Along the above lines, at 707, a decoder and a digital decision feedback equalizer of digital receiver 140 may optionally be powered or turned off in response to assertion of on/off signal 613, and, at 707, analog decision feedback equalizer 330 of analog receiver 300 may optionally be powered or turned on in response to assertion of on/off signal 613.

While the above description has generally been for a bimodal receiver, such as for a PAM-2 system, the above description is not limited to such a Pulse Amplitude Modulation ("PAM") system. From the above description, it should be appreciated that such system may be scaled upwards to PAM-4 and beyond, as well as may be used for other types of modulation.

Because one or more of the examples described herein may be implemented in an FPGA, a detailed description of such an IC is provided. However, it should be understood that other types of ICs may benefit from the technology described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices.

In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 8:
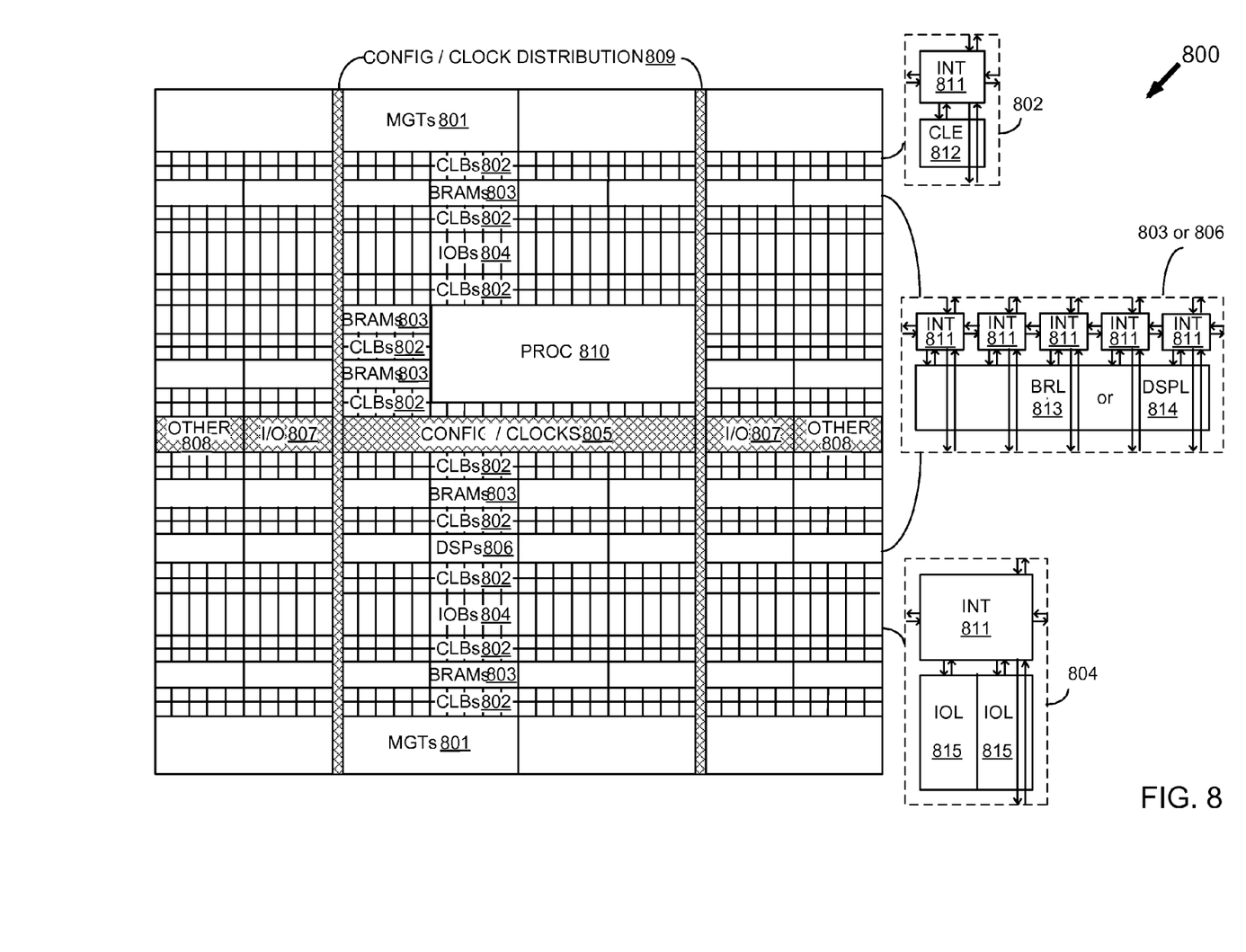
FIG. 8 is a simplified block diagram depicting an exemplary columnar Field Programmable Gate Array ("FPGA") architecture.

As noted above, advanced FPGAs can include several different types of programmable logic blocks in the array. For example, FIG. 8 illustrates an FPGA architecture 800 that includes a large number of different programmable tiles including multi-gigabit transceivers ("MGTs") 801, configurable logic blocks ("CLBs") 802, random access memory blocks ("BRAMs") 803, input/output blocks ("IOBs") 804, configuration and clocking logic ("CONFIG/CLOCKS") 805, digital signal processing blocks ("DSPs") 806, specialized input/output blocks ("I/O") 807 (e.g., configuration ports and clock ports), and other programmable logic 808 such as digital clock managers, analog-to-digital converters, system monitoring logic, and so forth. Some FPGAs also include dedicated processor blocks ("PROC") 810.

In some FPGAs, each programmable tile includes a programmable interconnect element ("INT") 811 having standardized connections to and from a corresponding interconnect element in each adjacent tile. Therefore, the programmable interconnect elements taken together implement the programmable interconnect structure for the illustrated FPGA. The programmable interconnect element 811 also includes the connections to and from the programmable logic element within the same tile, as shown by the examples included at the top of FIG. 8.

For example, a CLB 802 can include a configurable logic element ("CLE") 812 that can be programmed to implement user logic plus a single programmable interconnect element ("INT") 811. A BRAM 803 can include a BRAM logic element ("BRL") 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element ("DSPL") 814 in addition to an appropriate number of programmable interconnect elements. An IOB 804 can include, for example, two instances of an input/output logic element ("IOL") 815 in addition to one instance of the programmable interconnect element 811. As will be clear to those of skill in the art, the actual I/O pads connected, for example, to the I/O logic element 815 typically are not confined to the area of the input/output logic element 815.

In the pictured embodiment, a horizontal area near the center of the die (shown in FIG. 8) is used for configuration, clock, and other control logic. Vertical columns 809 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 810 spans several columns of CLBs and BRAMs.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for channel adaptation, comprising:
  receiving an analog input signal with a bimodal receiver via a communications channel;
  converting the analog input signal to a digital input signal with an analog-to-digital converter of a digital receiver of the bimodal receiver;
  detecting channel coefficients for the digital input signal associated with the communications channel;
  wherein the channel coefficients indicate a number of post-cursor taps of the bimodal receiver to be used to provide an equalized digital output signal from the digital input signal;
  determining whether the number of post-cursor taps or a value associated therewith is equal to or less than a threshold number; and
  switching from the receiving of the analog input signal by the digital receiver to an analog receiver of the bimodal receiver to provide the equalized digital output signal for the analog input signal.

2. The method according to claim 1, wherein in response to the receiving of the analog input signal with the analog receiver, powering down decision blocks of the analog-to-digital converter not used for the number of post-cursor taps used.

3. The method according to claim 1, wherein in response to the receiving of the analog input signal with the analog receiver, powering down a digital signal processing module of the digital receiver.

4. The method according to claim 1, wherein the analog-to-digital converter is a flash analog-to-digital converter.

5. The method according to claim 1, wherein:
  the detecting of the channel coefficients is by a channel estimator; and
  the channel coefficients are channel impulse response coefficients.

6. The method according to claim 5, further comprising transmitting a training signal via the communications channel to provide the analog input signal.

7. The method according to claim 5, wherein the detecting includes Least Mean Squared filtering.

8. The method according to claim 1, wherein the number of post-cursor taps is for a number of post-cursor tap coefficients, respectively, for a decision feedback equalizer of the bimodal receiver.

9. The method according to claim 1, further comprising decision feedback equalizing the analog input signal with a decision feedback equalizer of the analog receiver to provide the digital output signal equalized from the analog receiver.

10. The method according to claim 8, wherein a number of analog decision blocks of an unrolled decision feedback equalizer of the analog receiver corresponds to the number of post-cursor tap coefficients used.

11. The method according to claim 10, wherein the number of analog decision blocks are a number of comparators.

12. An apparatus for receiving an analog input signal via a communications channel, comprising:
    a digital receiver having an analog-to-digital converter;
    wherein the analog-to-digital converter comprises a plurality of decision blocks coupled to receive the analog input signal;
    wherein a subset of the plural of decision blocks have outputs coupled to a decoder of the analog-to-digital converter and coupled to an analog decision feedback equalizer of an analog receiver;
    a channel estimator of the digital receiver coupled to the analog-to-digital converter to obtain a digital input signal therefrom to provide at least one channel coefficient for the communications channel; and
    a controller coupled to provide an on/off signal to the analog-to-digital converter and to the analog decision feedback equalizer to turn off components of the digital receiver and turn on a component of the analog receiver.

13. The apparatus according to claim 12, further comprising a controller coupled to determine a number of post-cursor tap values to be used to equalize the digital input signal, wherein the number of post-cursor tap values exceeds a threshold for use of the analog receiver.

14. The apparatus according to claim 12, wherein the digital receiver is coupled to provide at least two thresholds to the subset of the plurality of decision blocks in response to the at least one channel coefficient.

15. A method for channel adaptation, comprising:
    receiving an analog input signal with a bimodal receiver via a communications channel;
    converting the analog input signal to a digital input signal with an analog-to-digital converter of a digital receiver of the bimodal receiver;
    detecting channel coefficients for the digital input signal associated with the communications channel;
    wherein the channel coefficients indicate a number of significant post-cursor taps of the bimodal receiver to be used to provide an equalized digital output signal from the digital input signal;
    determining the number of post-cursor taps is equal to or less than a threshold number;
    using a subset of a plurality of comparators of the analog-to-digital converter for an analog receiver of the bimodal receiver; and
    decision feedback equalizing outputs from the subset of the plurality of comparators with an analog decision feedback equalizer of the analog receiver to provide to an equalized digital output signal for the analog input signal.

16. The method according to claim 15, further comprising:
    asserting an on/off signal in response to the determining; and
    turning off the plurality of comparators other than the subset thereof in response to the asserting.

17. The method according to claim 16, further comprising:
    turning off a decoder and a digital decision feedback equalizer of the digital receiver in response to the asserting; and
    turning on the analog decision feedback equalizer of the analog receiver in response to the asserting.

18. The method according to claim 17, wherein:
    the analog-to-digital converter is a flash analog-to-digital converter; and
    the analog decision feedback equalizer is an unrolled analog decision feedback equalizer.

\* \* \* \* \*